No. 614,804. Patented Nov. 22, 1898.
C. E. FRANCIS.
IMPLEMENT FOR OPERATING SCREWS.
(Application filed Jan. 5, 1898.)
(No Model.)
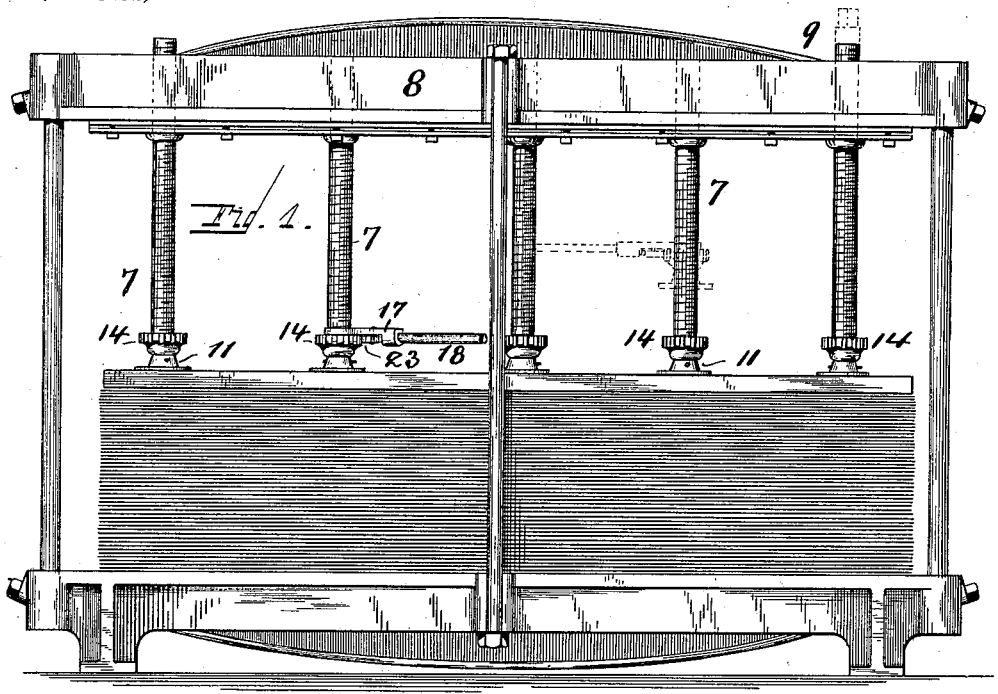
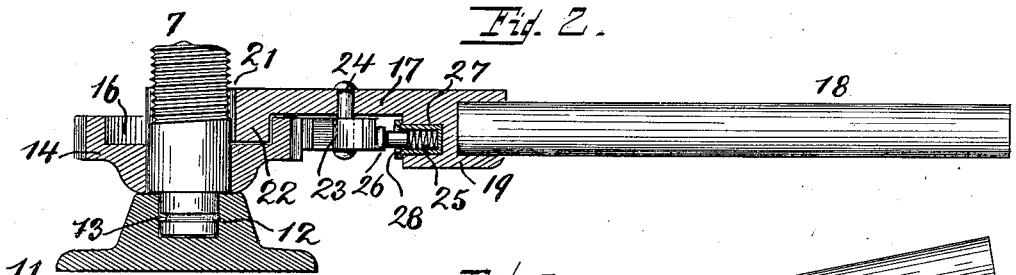
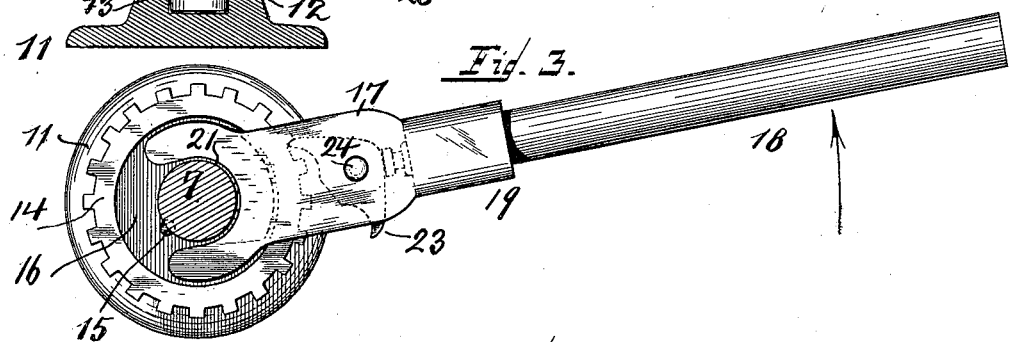
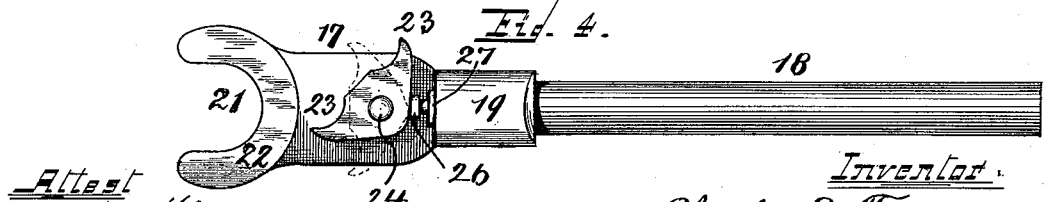
Attest
Arthur Kline
H. S. Northington
Inventor
Charles E. Francis
by C. Spengel atty.

UNITED STATES PATENT OFFICE.

CHARLES E. FRANCIS, OF CINCINNATI, OHIO.

IMPLEMENT FOR OPERATING SCREWS.

SPECIFICATION forming part of Letters Patent No. 614,804, dated November 22, 1898.

Application filed January 5, 1898. Serial No. 665,642. (No model.)

*To all whom it may concern:*

Be it known that I, CHARLES E. FRANCIS, a citizen of the United States, and a resident of Cincinnati, Hamilton county, State of Ohio, have invented a certain new and useful Implement for Operating Screws; and I do hereby declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to an implement to be used for turning screws—such as are used, for instance, in presses. It is more particularly intended for use on veneer-presses, a type of which is illustrated in my Patent No. 524,380. These presses consist, substantially, of a base and top connected by uprights with a space between. The pressure-screws are mounted in the top and have an adjustment to and from the base, upon which latter the material to be pressed is placed. For operating these screws a key, wrench, lever, or other suitable implement is used and applied at their upper ends, which are usually formed square for the purpose of receiving such implement. The fact that these ends are in most cases at man's height or considerably above, a position very inconvenient for using a tool to advantage, makes manipulation in the manner stated very objectionable, because impeding exertion of the requisite force. It is furthermore very tiresome to move at such height with uplifted arms the tool out from one screw to and into the others, since there are generally a number of them in a press, all of which must be operated. A tool of the kind mentioned cannot be applied at the lower end of the screws on account of the necessary presence thereat of an enlargement or shoe which comes in contact with the matter to be pressed. It is furthermore impossible to apply a tool to these shoes for the reason, principally, that they are loosely mounted on these ends to prevent during tightening of the screws their rotation with them, which would cause injury to the matter to be pressed and twist and displace it.

The object of my invention is therefore to provide an implement which may be applied at a height convenient to the operator and in a position conducive for producing best results with the power exerted. With these objects in view I have provided an implement which may be applied laterally to the screws—that is, between their ends—since application at the lower end is impossible and at the upper one undesirable. By preference I have selected the point of application immediately above the lower end of the screws as being closest to the point where the pressure is applied, most convenient as to height, and as not interfering with the use of the full length of the screw, which would limit the range of its adjustment.

Other desirable objects which I have attained by my invention are ready removal and replacing of the implement, so that only one is required, which is so fitted as to permit it to be used on all the screws of the press, and which change may be accomplished without having to hold the weight of the tool with uplifted arms.

My improved implement has also unlimited capacity of being swung through any part of a circle, so that even where this capacity is limited by the proximity of other screws or frame parts the tool may be used to advantage.

In the following specification, and particularly pointed out in the claim, is found a full description of the invention, its manner of use, parts, and construction, which latter is also illustrated in the accompanying drawing, in which—

Figure 1 is a front elevation of a press carrying a number of pressure-screws, to one of which my interchangeable implement is applied. Fig. 2 is an enlarged sectional side elevation of the lower end of a screw with the implement applied. Fig. 3 is a top view of Fig. 2 with the screw in section. Fig. 4 is an under side view of the tool detached.

7 are the screws, mounted in the top 8 of the press, usually in nuts thereat. Their upper ends, when operated in the old way, are square, as shown in dotted lines at 9 of Fig. 1, to permit attachment of an ordinary wrench or key-lever. At their lower ends they carry flanges or shoes 11, loosely connected, to prevent their rotation with the screws when they are tightened. In detail this connection is obtained by a key 12, occupying a hole in the hub of the shoe and passing through an annular groove 13 in the lower end of the screw, which permits the desired rotation. Above this shoe there is a notched flange 14, which, by means of a key 15, is rigidly connected to the screw. In the upper side of this flange is formed a circular recess 16, as shown. The implement consists of a flat shank 17, ending in a handle 18, which is connected by insertion into a boss 19 on one end of the shank. At the other end the shank has a notch 21, formed on an approximately half-circular line and fitted to the size of the screw. Around this notch and on the under side of the implement there is formed a marginal rim 22 of a depth and width to fit into recess 16. Inwardly from this rim there is a pawl 23 pivotally connected at 24 and so located as to be capable when the tool is in position of engaging the notches of flange 14, against the rim of which it is yieldingly held by a spring 25 acting against the heel of the pawl. As to these parts the operation is the same as the one of the well-known ratchet-wrench or ratchet-drill, the pawl slipping loosely over the teeth of flange 14 when the tool is swung in one direction and engages the nearest notch when swung in the other direction.

During operation the tool is readily held in place by notch 21, which receives the screw, and by rim 22, which occupies recess 16. It is readily removed by lifting it until rim 22 clears recess 16, when it is simply taken away from the screw. For reëngagement its notched end is pushed against the screw immediately above flange 14, after which it is dropped onto the latter, which brings rim 22 into recess 16. To permit active use in either direction, two pawls 23 are provided, which, however, for convenience are formed on one hub and are carried on the same pivot. When a change of direction is required, it is only necessary to turn the required pawl into operative position, the spring back of it yielding sufficiently and afterward holding the pawl in place. As to details of construction the shank is preferably formed of cast-iron, with the wrought-iron handle tapped or cast into it.

In place of having the outer end of spring 25 bearing directly against the heel of the pawl I prefer to interpose a plug 26, carried at the outer end of the spring and provided with a head to prevent it from slipping in. These parts are carried in a bore cored out in boss 19. To obviate finishing this bore, I provide a socket or ferrule 27, which receives the spring and is set in the cored-out bore. All these parts are readily held in place by the pawl in front. Around its opening the ferrule has a recess 28 to receive the head of plug 26 and permits complete depression of the same in case such is required to permit turning of the pawls when changing their position. The presence of flange 14 provides an additional advantage, inasmuch as it may be used direct for running the screws quickly to or from the work after the tool has first been used to start them. For such purpose the hands are applied to this flange and the same is whirled around. Shoe 11 could not be used for such purpose, inasmuch as it is only loosely connected. It may be mentioned yet that when once in position the implement need not be removed for taking a new turn, as is done when an ordinary wrench is used, which must be changed every time the limit of a turn is reached, and therefore it remains in position until the manipulation of a screw is ended. Being held in the manner described, by resting on flange 14 the operator is enabled to swing the implement with one hand, leaving the other free for use to hold the work, if necessary.

Having described my invention, I claim as new—

An implement intended for operating the screws of a veneer-press where such screws are provided with a loosely-attached shoe 11 at their lower ends and have a rigidly-connected notched flange 14 above such shoe which has a circular recess 16 in its upper side, such implement consisting of a flat shank 17 having at one end a socket and an operating-handle inserted therein, an open notch 21 at the other end adapted to temporarily receive the screw to be manipulated, a marginal rim on the under side of shank 17 surrounding notch 21 and fitted to be received by recess 16 when the tool is in position, two pawls 23 formed in one piece and pivotally connected to shank 17 and a spring adapted to hold either one of them in operative position for engagement with notched flange 14.

In testimony whereof I hereunto affix my signature in presence of two witnesses.

CHARLES E. FRANCIS.

Witnesses:
C. SPENGEL,
ARTHUR KLINE.